Jan. 22, 1957 V. J. HIRSCH 2,778,335
BIRD HARNESS
Filed July 5, 1955

INVENTOR.
Virginia J. Hirsch
BY
ATTORNEY.

United States Patent Office

2,778,335
Patented Jan. 22, 1957

2,778,335

BIRD HARNESS

Virginia J. Hirsch, Kansas City, Mo.

Application July 5, 1955, Serial No. 519,929

7 Claims. (Cl. 119—109)

This invention relates to a harness particularly adapted for use on birds, the primary object being to provide a novel arrangement of parts capable of being attached to the bird without danger of displacement or injury to the bird and having means in the nature of a leash for control purposes.

It is the most important object of the instant invention to provide a bird harness that is equipped with a collar, as well as a pair of loops, all so associated as to receive the neck of the bird, as well as his wings, in a confining, yet comfortable, manner.

A further object of this invention is the provision of a bird harness having the neck-impaling collar aforementioned, as well as the wing-receiving loops, together with a releasable catch for permitting quick and easy mounting of the harness and removal as desired.

Other objects include important details of construction to be made clear or become apparent as the following specification progresses reference being had to the accompanying drawing, wherein.

As will hereinafter appear, the harnesses of all three embodiments chosen for illustration of the instant invention are preferably made from a single length of flexible material of any desired character. A lightweight, yet sturdy silk or nylon cord has, by way of example, been found to be most satisfactory.

Figure 1:
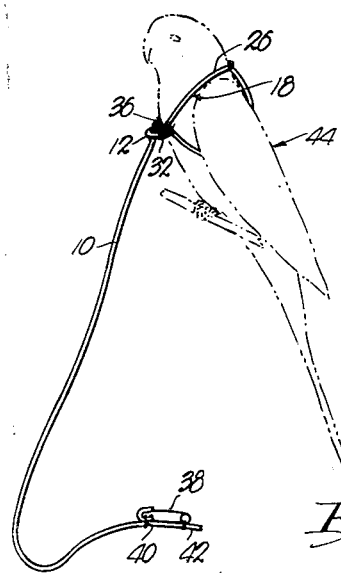
Figure 1 is a perspective view of a bird harness made according to one form of the instant invention illustrating the same operably mounted on a bird.
Figure 2:
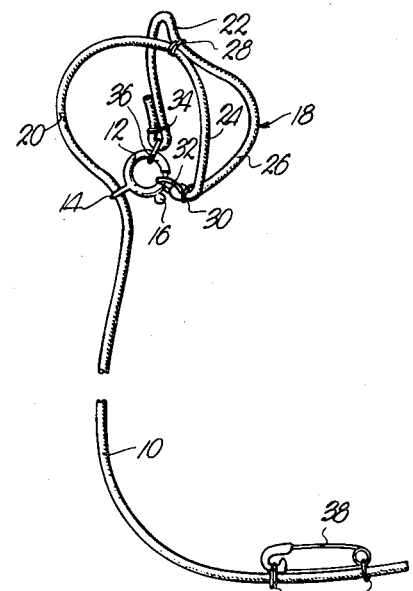
Fig. 2 is a perspective view of the harness shown in Fig. 1 removed from the bird.
Figure 3:
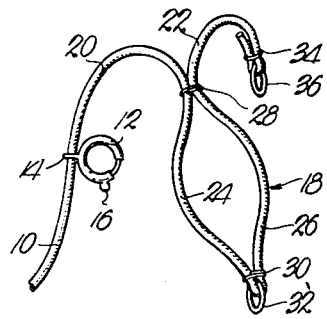
Fig. 3 is a fragmentary, perspective view of the harness depicted in Figs. 1 and 2, showing the various parts unfastened.

In the embodiment shown in Figs. 1 to 3 inclusive, the harness material is formed to present an elongated leash 10 to which is attached a ring catch 12 having eye 14 clipped tightly to the leash 10. The ring catch 12 of conventional character, is provided with a spring-loaded, manually operable latch 16.

The harness per se includes a neck-impaling collar broadly designated by the numeral 18, and a pair of wing-receiving loops 20 and 22. The loop 20 continues as an integral part of the leash 10 from the eye 14 of ring catch 12 and joins integrally with one segment 24 of the collar 18. The other segment 26 of the collar 18 is integral with the segment 24 and with the loop 22.

Segments 24 and 26 are joined at the top thereof by a clip 28 and at the bottom thereof by a clip 30, the latter holding an eye or ring 32 in place on the collar 18. Similarly, a clip 34 at the outermost free end of the loop 22, retains an eye or ring 36. It is seen that the catch 12 is adapted to receive both of the eyes 32 and 36.

A suitable fastener is secured to the leash 10 and which may take the form of an ordinary safety pin 38 mounted on the leash 10 by a pair of clips 40 and 42.

The harness may be mounted on the bird 44 in the manner illustrated in Fig. 1 of the drawing with collar 18 encircling the neck of the bird and with the loops 20 and 22 receiving the wings therebeneath. When the harness is fastened in place through use of the catch 12 receiving eyes 32 and 36 at the breast of the bird, the harness is held securely in place and cannot be torn loose or otherwise displaced.

It is intended that the harness be used primarily to confine pet birds, such as parakeets, and therefore, the owner may utilize the fastener 38 as a means of leashing the bird to the owner's clothing, as for example, adjacent his shoulder where the bird remains perched. In that event it may be preferred to reverse the harness so as to dispose the catch 12 together with the eyes 32 and 36 at the back of the bird 44 and in this respect it is to be noted that the harness is well adapted for such reversed mounting.

In any event the harness is so well balanced that no injury can come to the bird 44 by its use and when it is on a perch as shown in Fig. 1, the connecting parts 12, 32 and 36 are disposed well below his neck so as to avoid any possibility of strangulation or other injury.

Figure 4:
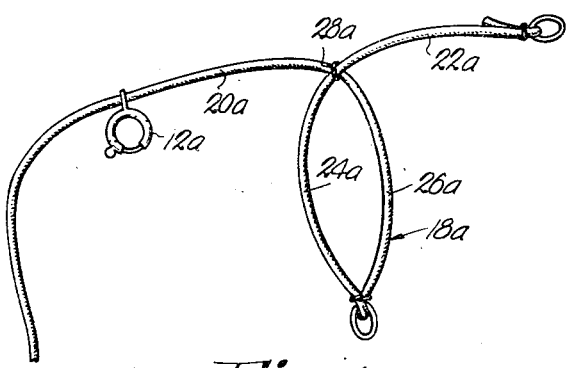
Fig. 4 is a fragmentary, perspective view of a modified form of harness.

The embodiment of my invention shown in Fig. 4 of the drawing is identical with that just above described except only that segments 24a and 26a of collar 18a, are crossed at the point of joinder with loops 20a and 22a respectively, clip 28a holding the crossed portions in place.

Figure 5:
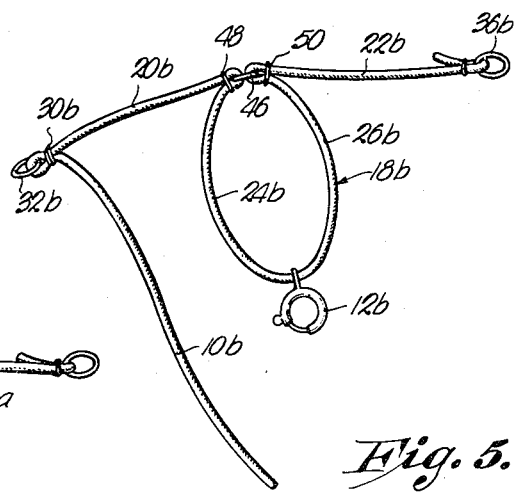
Fig. 5 is a perspective view of a bird harness embodying still another form of the instant invention.

In the embodiment of my invention shown in Fig. 5, ring catch 12b is attached at the lowermost end of the collar 18b and a ring 46 is employed to interconnect the segments 24b and 26b of the collar 18b.

Clips 48 and 50 hold the segments 24b and 26b in place looped through the ring 46. Segment 24b extends into an integral wing-receiving loop 20b, and the latter in turn extends into an integral leash 10b. A clip 30b retains an eye or ring 32b at the juncture between loop 20b and leash 10b.

The segment 26b of collar 18b, extends integrally from clip 50 into a wing-receiving loop 22b having an eye or ring 36b secured thereto. The catch 12b receives eyes 32b and 36b for mounting the harness upon the bird 44 in the same manner as illustrated in Fig. 1 of the drawing.

Having thus described the invention what is claimed as new and desired to be secured by Letters Patent is:

1. A bird harness comprising a continuous length of flexible material presenting a leash; a releasable ring catch secured to the leash; a first wing-receiving loop extending from the catch; a neck-impaling collar having a pair of segments; a catch-receiving eye attached to the collar at one end of the segments; a clip interconnecting the segments at the opposite end thereof, said opposite end of one of the segments extending from said first loop at the clip; a second wing-receiving loop extending from said opposite end of the other of said segments at the clip; and a catch-receiving eye attached to the second loop.

2. A bird harness comprising a continuous length of flexible material presenting a leash; an eye attached to the leash; a first wing-receiving loop extending from the eye; a neck-impaling collar having a pair of segments; an eye-receiving, releasable catch attached to the collar at one end of the segments; a ring interconnecting the segments at the opposite end thereof, said opposite end of one of the segments extending from said first loop at the ring; a second wing-receiving loop extending from said opposite end of the other of said segments at the ring; and a catch-receiving eye attached to the second loop.

3. A bird harness comprising a neck-impaling collar; a pair of separate wing-receiving loops, each having a pair of ends; means rigidly attaching one end of the loops to the collar at one end of the latter; releasable means common to the loops and the collar for attaching the opposite ends of the loops to the collar at the opposite end of the latter; and a leash extending from said opposite end of one of the loops.

4. A bird harness comprising a neck-impaling collar provided with a ring at one end thereof; a pair of separate wing-receiving loops, each having a pair of ends; a ring attached to one end of each loop respectively; and means rigidly attaching the opposite ends of the loops to the collar at the opposite end of the latter, one of the rings receiving the remaining rings and having a releasable latch.

5. A bird harness comprising a neck-impaling collar provided with a ring at one end thereof; a pair of separate wing-receiving loops, each having a pair of ends; a ring attached to one end of each loop respectively; a leash extending from said one end of one of the loops; and means rigidly attaching the opposite ends of the loops to the collar at the opposite end of the latter, one of the rings receiving the remaining rings and having a releasable latch.

6. A bird harness comprising a neck-impaling collar provided with a ring at one end thereof; a pair of separate wing-receiving loops, each having a pair of ends; a ring attached to one end of each loop respectively; a leash extending from said one end of one of the loops; and means rigidly attaching the opposite ends of the loops to the collar at the opposite end of the latter, one of the rings receiving the remaining rings and having a releasable latch, said one ring being rigidly attached to the leash at said one end of said one loop.

7. A bird harness comprising a neck-impaling collar provided with a ring at one end thereof; a pair of separate wing-receiving loops, each having a pair of ends; a ring attached to one end of each loop respectively; and means rigidly attaching the opposite ends of the loops to the collar at the opposite end of the latter, one of the rings receiving the remaining rings and having a releasable latch, said one ring being rigidly attached to the collar.

References Cited in the file of this patent
UNITED STATES PATENTS

| | | |
|---|---|---|
| 2,289,802 | Norton | July 14, 1942 |
| 2,458,489 | Hallander | Jan. 4, 1949 |
| 2,605,744 | Urbanski | Aug. 5, 1952 |
| 2,703,553 | Cooke | Mar. 8, 1955 |